(12) United States Patent
Vandermeer

(10) Patent No.: US 6,214,102 B1
(45) Date of Patent: Apr. 10, 2001

(54) BONDING OF CERAMIC FIBERS

(75) Inventor: John Vandermeer, Newark, DE (US)

(73) Assignee: Wes Bond Corp., Wilmington, DE (US)

( * ) Notice: Subject to any disclaimer, the term of this patent is extended or adjusted under 35 U.S.C. 154(b) by 0 days.

(21) Appl. No.: 09/323,728

(22) Filed: Jun. 1, 1999

Related U.S. Application Data

(62) Division of application No. 08/971,339, filed on Nov. 17, 1997, now Pat. No. 5,945,049.
(60) Provisional application No. 60/060,097, filed on Sep. 29, 1997.

(51) Int. Cl.$^7$ ................................ C08L 3/04; C04B 35/80
(52) U.S. Cl. ................................ 106/214.1; 106/217.01; 106/217.3; 162/145; 162/152; 162/175; 264/86; 264/87; 501/95.2
(58) Field of Search .......................... 106/214.1, 217.01, 106/217.3; 162/145, 152, 175; 264/86, 87; 501/95.2

(56) References Cited

U.S. PATENT DOCUMENTS

| | | |
|---|---|---|
| 2,806,270 | 9/1957 | Shaul . |
| 2,829,060 | 4/1958 | Emblem et al. . |
| 3,396,775 | 8/1968 | Scott . |
| 3,455,368 | 7/1969 | Shepherd . |
| 3,748,157 | 7/1973 | Moore . |
| 3,751,276 | 8/1973 | Beyer et al. . |
| 5,271,888 | 12/1993 | Sinsley . |
| 5,273,821 * | 12/1993 | Olson et al. ......................... 428/357 |
| 5,290,350 * | 3/1994 | Besnard et al. ...................... 106/214 |
| 5,693,274 | 12/1997 | Kim . |

OTHER PUBLICATIONS

Guyadec et al., Inorganic Binders for High Temperatures: Vacuum Forming of Ceramic Fibres, Universite Joseph Fourier, France, 1992.
Willis, Bonding Inorganic Fiber Compositions with Ludox Colloidal Silica and Positive SOL 130M, E.I. Du Pont De Nemours & CO, 1972.
Akzo Nobel Technical Bulletin 10, 1996.
Akzo Nobel Product Bulletin, Bindzil 50/80 1995.
Eka Nobel Technical Bulletin, "Binders for Refractory Materials–Bindzil as binders for ceramic fibre products", 1995.
Ludox Colloidal Silica Data Sheet, E.I. Du Pont De Nemours & Co., Pub. No. E–05246, 1975.
Dupont Ludox*–Starch Process for Binding Inorganic Refractory Fibres, 1969.

* cited by examiner

*Primary Examiner*—James Derrington
(74) *Attorney, Agent, or Firm*—Law Offices of John A. Parrish

(57) ABSTRACT

A method of vacuum forming of aqueous, fibrous slurries and products produced thereby are disclosed. The method entails forming an aqueous slurry of ceramic fiber, cationic starch and silica sol. The silica has, based on total weight of the sol, about 50% silica having a particle size range of from about 7 nm to about 200 nm and a specific surface area of about 100 $m^2$/gm to about 10 $m^2$/gm. The slurry is passed through a porous screen under a vacuum pressure deposit the solids content onto the screen to produce high strength products.

13 Claims, No Drawings

BONDING OF CERAMIC FIBERS

This is a division of application Ser. No. 08/971,339, filed Nov. 17, 1997 now U.S. Pat. No. 5,945,049, and priority is claimed to U.S. provisional application Ser. No. 60/060,097 filed Sep. 29, 1997.

FIELD OF THE INVENTION

This invention relates to methods of vacuum forming of ceramic fibrous slurries into shaped products.

BACKGROUND OF THE INVENTION

U.S. Pat. No. 3,224,927 shows the use of cationic starch to precipitate silica binders onto refractory fibers for forming refractory papers and mats. Although the teachings of this patent are useful for manufacture of shaped ceramic fiber products, the amount of silica binder which can be flocked onto the ceramic fibers is limited by the flocking capacity of the cationic starch; namely, to about 1.5 units silica per unit of starch. In addition, the amount of starch which can be used cannot exceed about 8%. Otherwise, forming times are high and shapes stick to molds. Binder content and formulations therefore are restricted to levels that produce only moderately strong pieces, i.e., 80–120 PSI modulus of rupture. A need therefore exists for improved methods of vacuum forming shaped ceramic fiber products

SUMMARY OF THE INVENTION

The invention relates to an aqueous ceramic slurry comprising ceramic fibers, cationic starch, and colloidal silica, a method of vacuum forming the slurry, and ceramic products formed by that method. The slurry typically has a solids content of about 0.5% to about 3% based on total weight of the slurry, about 0.5% to about 2% ceramic fiber based on the total weight of the slurry, about 0.01% to about 0.7% silica based on the total weight of the slurry, about 0.005% to about 0.2% cationic starch based on the total weight of the slurry, remainder water. The silica sol has, based on the weight of the sol, about 50% silica having a particle size range of from about 7 nm to about 200 nm and a specific surface area of about 100 $m^2$/gm to about 10 $m^2$/gm, remainder water.

The method of vacuum forming the slurry entails passing the slurry through a porous screen under a vacuum pressure deposit the solids content of the slurry onto the screen to produce a shaped product. The ceramic products produce typically include ceramic fiber in an amount of about 62% to about 96% by weight based on total weight of the ceramic product, about 2% to about 30% silica by weight based on total weight of the product, and about 1% to about 8% of cationic starch by weight based on the total weight of the product.

Having summarized the invention, the invention will now be described in detail by reference to the following detailed description and non-limiting examples.

DETAILED DESCRIPTION OF THE INVENTION

In accordance with the invention, an aqueous slurry having ceramic fiber, silica sol having a large particle size and broad particle size distribution, and starch is vacuum formed to provide shaped products. The aqueous slurry of ceramic fiber, starch and silica sol has a solids content of about 0.5% to about 3% by weight based on the total weight of the slurry, preferably about 0.7% to about 1% solids by weight based on total weight of the slurry, about 0.5% to about 2% ceramic fiber by weight based on total weight of the slurry, preferably about 0.7% ceramic fiber by weight based on total weight of the slurry, about 0.01% to about 0.7% silica by weight based on total weight of the slurry, preferably about 0.02% to about 0.21% silica by weight based on the total weight of the slurry, about 0.005% to about 0.2% cationic starch by weight based on total weight of the slurry, preferably about 0.01% to about 0.07% cationic starch by weight based on total weight of the slurry, remainder water.

Optionally, a filler material such as ceramic fillers and organic fillers, preferably ceramic fillers, may be included in the aqueous slurry of ceramic fiber, silica sol, and starch to provide a modified slurry that also may be vacuum formed. The filler may be included in an amount of up to about 1% by weight based on the total weight of the modified slurry. The modified slurry having ceramic fiber, silica sol, starch, and ceramic filler has about 0.5% to about 3% solids by weight based on the total weight of the modified slurry, preferably about 0.07% to about 1.7% by weight of solids by weight based on the total weight of the modified slurry. Ceramic fibers are present in the modified slurry an amount of about 0.5% to about 2% by weight based on total weight of the modified slurry, preferably about 0.7% by weight based on the total weight of the modified slurry, silica is present in an amount of about 0.01% to about 0.7% by weight based on total weight of the modified slurry, preferably about 0.02% to about 0.21% based on the total weight of the modified slurry, cationic starch is present in an amount of about 0.005% to about 0.2% by weight based on total weight of the modified slurry, preferably about 0.01% to about 0.07% by weight based on the total weight of the modified slurry remainder water. Preferably the filler is a ceramic filler present in an amount of up to about 1.0% by weight based on the total weight of the modified slurry. The preferred silica sols employed in the aqueous slurries which are vacuum formed into dried ceramic products in accordance with the invention are aqueous, colloidal dispersions of discrete amorphous silicon dioxide particles in slightly alkaline water that includes, based on the total weight of the sol, about 50% silica, remainder water. These sols are available from Wesbond Corporation, Wilmington, Del. under the name Megasol™. The sols may be used at a pH of about 8.0 to about 10.0, preferably at a pH of about 9.0 to about 9.5. The sols may be used in particle size ranges of about 7 nm to about 200 nm, preferably in particle size ranges of about 8 nm to about 190 nm, most preferably at a particle size range of about 10 nm to about 180 nm. The sols may be used with specific surface areas varying from about 100 $m^2$/gm to about 10 $m^2$/gm, preferably 80 $m^2$/gm to about 20 $m^2$/gm, most preferably about 60 $m^2$/gm to about 27 $m^2$/gm. The sols may be used at titratable $Na_2O$ contents of about 0.02% to about 0.35%, preferably about 0.1% to about 0.25%, most preferably about 0.20% to about 0.22%.

Silica sols such as Megasol™ which may be employed in the invention have larger particle size ranges and lower specific surface areas than prior art colloidal silica sols. These characteristics advantageously enables the use of much lower amounts of cationic starch to floc silica onto ceramic fibers, and to floc much larger amounts of silica onto the ceramic fibers. This enables manufacture of dried ceramic products such as ceramic fiberboard which have much lower organic content and higher strengths, and to produce products which sinter more slowly so that less shrinkage is experienced at elevated use temperatures.

The cationic starches which may be employed in the aqueous slurries which are vacuum formed in accordance with the invention preferably are pregelationized cationic corn starches that have been treated with a cationic amine, cooked and flaked. These cationic starches are available under the tradename WESTAR+ from Wesbond Corporation, Wilmington, Del. These cationic starches have a cationic charge of about 0.18% $N_2$ to about 0.22% $N_2$, and a pH of about 4 to 8. Higher cationic charge starches (0.30%N) such as WESTAR+3 corn starch from Wesbond Corp. also may be employed. Other starches which can be used in the compositions and process disclosed herein include, but are not limited to SOLVATOSE Potato Starch, EMPRESOL Potato Starch, and STA-LOK potato starch. SOLVATOSE Potato Starch, available from American Key Products, Inc. Kearney, N.J., is a pregelationized cationic potato starch that has been treated with a cationic amine, cooked and flaked. This starch has a cationic charge, as measured by Nitrogen content, of about 0.30%$N_2$.

EMPRESOL Potato Starch, available from American Key Products, Inc. Kearney, NJ, also is a pregelationized cationic potato starch that has been treated with a cationic amine, cooked and flaked. This starch has a cationic charge, as measured by Nitrogen content, of about 0.30%$N_2$. STA-LOK potato starch, available from Staley industrial Products, Decatur, Ill., is a pregelationized cationic potato starch that has been treated with a cationic amine, cooked and flaked. The starch has a cationic charge, as measured by Nitrogen content, of about 0.30%$N_2$.

Ceramic fibers which can be employed in the slurries which are vacuum formed in accordance with the invention include, but are not limited to aluminosilicate fibers such as "Fiberfrax" Regular fibers, "Fiberfrax" 6000 fibers from Unifrax Corporation, Niagara Falls, N.Y., "Fiberfrax" Spun fibers from Unifrax Corporation, and "Kaowool" Ceramic Fibers from Thermal Ceramics, Augusta, Ga. Preferably, the ceramic fibers are any of "Fiberfrax" 6000 fibers, "Fiberfrax" Spun Fibers, and "Fiberfrax" Regular fibers. These ceramic fibers may be used in dimensions of about 2–3 microns diameter and about four inches length. "Fiberfrax" Regular fibers have about 47–53% alumina, 48–53% silica, about 0.1% $Fe_2O_3$, about 0.1%$TiO_2$, about 0.1–1.3% $Na_2O$, and about 0.5% trace impurities. "Fiberfrax" 6000 fibers and "Fiberfrax" Spun Fibers, are, according to Fiberfrax Co., made from Kaolin. "Fiberfrax" 6000 and "Fiberfrax" Spun fibers typically have 45–51% alumina, 46–52% silica, about 0.8–1.1% $Fe_2O_3$, about 1.0–1.8% $TiO_2$, about 0.1–0.2% $Na_2O$, and about 1.0% trace impurities.

Other ceramic fibers which may be employed include but are not limited to alumina fiber, silica fibers such as those sold under the tradename "Maxsil" by McAllister Mils, Independence, Va., glass fibers such as "Insulfrax" from Unifrax Corporation, Niagara Falls, N.Y., mineral wools, and other fibers designed to operate at high temperatures; i.e. above 1400° F., also may be used as ceramic fibers in the invention. Optionally, organic fibers may be included with the ceramic fibers. Examples of organic fibers which may be employed include but are not limited to cellulose fibers, aramid fibers, and polyethylene fibers.

In accordance with the invention, an aqueous ceramic fiber-water mixture is formed by adding ceramic fibers, optionally with organic fibers such as those above, to water. Optional fillers such as ceramic and organic fillers may be included. Examples of ceramic fillers include but are not limited to oxides such as alumina, alumino-silicates such as Mullite, and clays such as Kyanite. Examples of organic fillers include but are not limited to cellulose and polyethylene. The fillers may be employed in fiber, pulp or powder form.

The fiber-water mixture, optionally including filler, then is subjected to moderate agitation by a propeller mixer to disperse the fibers and to ensure that uniform flocs can be formed. Thereafter, cationic starch is added with moderate agitation for about 5–10 minutes to hydrate the starch. The resulting fiber-starch-water composition has a pH of about 4–8, a total solids content of about 0.5% to about 3% by weight based on the total weight of the fiber-starch-water composition, preferably about 0.7% to about 0.8% total solids content based on the total weight of the fiber-starch-water composition, about 0.5% to about 2.7% by weight ceramic fiber based on the total weight of the fiber-starch-water composition, preferably 0.7% by weight ceramic fiber based on the total weight of the fiber-starch-water composition, about 0.005% to about 0.3% starch by weight based on the total weight of the fiber-starch-water composition, preferably about 0.01% to about 0.07% by weight starch based on the total weight of the fiber-starch-water composition, remainder water.

After producing the above described fiber-starch-water composition, sufficient Megasol™ silica sol is added to achieve about 4–30% by weight silica based on the weight of the fiber in the fiber-starch-water composition. The Megasol™ is added to the fiber-starch-water composition during moderate mixing to floc the fibers into 3-dimensional flocs. The amount of Megasol™ silica sol added is controlled to achieve a ratio of silica to starch of about 1:1 to about 5:1, preferably about 2:1 to about 4:1, most preferably about 2:1 to about 3:1.

The resulting aqueous ceramic fiber-starch-silica slurry has three dimensional flocs and can be vacuum formed onto a screen mold to yield a shaped preform. Vacuum pressures of about 20 inches Hg to about 29 inches Hg typically are employed during vacuum forming. Vacuum forming of the slurries may be performed to produce products of any desired thickness and shape. Typically, the aqueous slurries are vacuum formed to provide preforms of about 1 to about 4 inches thick.

After producing the vacuum formed shapes, the preforms are removed from the mold and dried. Typically, drying is performed at about 250° F. for about 3–4 hours to yield a dried product. Other drying conditions may be used depending on the composition and thickness of the preform. Thereafter, the dried product optionally may be fired at elevated temperatuers such as about 1800° F. for about one hour. Other firing temperatures and conditions may be used depending on the composition and thickness of the dried product.

The dried products produced by the process described herein typically include ceramic fiber in an amount of about 62% to about 96% by weight based on total weight of the dried product, preferably about 72% to about 94% by weight ceramic fiber based on the total weight of the dried product, about 2% to about 30% by weight silica based on total weight of the product, preferably about 4% to about 21% by weight silica based on total weight of the product, and about 1% to about 8% by weight cationic starch based on total weight of the product, preferably about 2% to about 7% by weight cationic starch based on the total weight of the product. The dried products produced by the process described herein typically have a modulus of rupture ("MOR") of about 100 PSI to abc At 500 PSI, a density of about 14 lb/ft$^3$ to about 25 lb/ft$^3$, and a Shore hardness of about 60 to about 80.

The use in the invention of the silica sol compositions disclosed herein having the wide range of silica particle sizes and low surface areas advantageously enables an increase of silica binder content of about 200% to about 300% compared to prior art sols to achieve products which have dried and fired strengths more than twice that which can be obtained with prior art silica sols having smaller particles and narrower particle size ranges. The dried products produced by the process described herein have increased strength which translate into more durable products.

The dried products optionally may be fired at elevated temperatures such as at about 1800° F. for about one hour. Firing of the dried products yields fired ceramic articles which have ceramic fiber in an amount of about 67% to about 98% by weight based on the total weight of the fired article, preferably about 77% to about 96% by weight ceramic fiber based on the total weight of the fired article, and about 2% to about 33% by weight silica based on the total weight of the fired article, preferably about 4% to about 23% silica by weight based on the total weight of the fired article. The fired articles typically have a high modulus of rupture ("MOR") of about 60 PSI to about 200 PSI, and a fired linear shrinkage of about 1% to about 1.2%. The fired articles produced by the process described herein have increased strength which translates into a more durable finished product.

EXAMPLES

The following non-limiting examples further illustrate this invention. All parts and percentages are expressed in terms of parts by weight based on fiber weight unless otherwise noted. Modulus of rupture data is obtained by breaking test bars which measure 3 inches wide by 3.5 inches long by 0.3–0.5 inches thick as cut from vacuum formed products. Using a 2 inch span, the test bars are center loaded to failure in flexure. Modulus of rupture values are calculated using the formula:

$$R=(3Wl)/(2bd^2)$$

Where:

R=modulus of rupture in lbs/in$^2$

W=load in pounds at which the specimen failed

I=distance (span) in inches between the center-lines of the lower bearing edges b=width of specimen in inches d=depth of specimen in inches

Example 1

A dilute slurry is prepared containing 80 grams of "Fiberfrax" aluminosilicate bulk fiber in 25 pounds (3 gallons) of water. To this slurry, 4 grams of Westar+Cationic Corn Flaked Starch ( 5% by weight of fiber) is added dry and mixed for 5 minutes to allow starch to hydrate. Next, 24 grams of Megasol™ (50% solids) is added to floc the starch and fibers together in a three dimensional floc, which is then vacuum formed through a 6.5 inch×6.5 inch×1 inch screen mold. The shape is removed from the mold and dried at 250° F. until thoroughly dry (3 to 4 hours). Strength, density, and shrinkage properties of this composite product are given below.

Weight Ratio of fiber:silica:starch 32 100:15:5

Silica: Starch=3:1

Density, Dried=15.0 lbs/ft$^3$

Modulus of rupture (MOR), Dried=214 PSI

Modulus of rupture (Fired 1 hour at 1800° F.)=90 PSI

Fired linear shrinkage=1.0%

Examples 2–6

In Examples 2–6, Example 1 is repeated using silica to starch ratios from 1:1 to 4:1 for both Megasol and a commonly used sol, Ludox HS 40, available from DuPont Corp. Ludox HS40 has the following properties:

| Silica solids, by weight | 40% |
| Surface Area, sq. meters/gm. | 230 |
| Particle Size, nanometers | 12 avg. |
| Na$_2$O, weight % | 0.41 |
| pH | 9.7 |

| | | | Dried MOR | | Fired MOR** | |
| --- | --- | --- | --- | --- | --- | --- |
| Example | Wt. Ratio* | Silica:Starch | Megasol™ | Ludox HS | Megasol | Ludox HS |
| 2 | 100:5:5 | 1:1 | 160 | 117 | 57 | 50 |
| 3 | 100:10:5 | 2:1 | 195 | 88 | 79 | 48 |
| 4 | 100:15:5 | 3:1 | 214 | 70 | 90 | 37 |
| 5 | 100:20:5 | 4:1 | 222 | 68 | 98 | 66 |
| 6 | 100:7.5:2.5 | 3:1 | 117 | 57 | 66 | 27 |

*fiber:silica:starch ratio
**1 hour at 1800° F.

Example 7

A dilute slurry is prepared by adding 80 grams of "Fiberfrax 6000" aluminosilicate bulk fiber to 25 pounds (3 gallons) of water. To this slurry, 4 grams of WESTAR+ Cationic Corn Flaked Starch (5% by weight of fiber) is added dry and mixed for 5 minutes to allow the starch to hydrate. Next, 24 grams of Megasol™ (50% solids) is added to floc the starch and fibers together into three dimensional flocs. The flocced material is then vacuum formed through a 6.5 inch×6.5 inch×1 inch screen mold to yield a shaped preform. The preform is removed from the screen mold and dried at 250° F. until thoroughly dry (3 to 4 hours). Strength, density, and shrinkage properties of this composite product are given below.

Weight Ratio (fiber:silica:starch)=100:15:5

Silica:Starch=3:1

Density, Dried=15.2 lbs./ft$^3$

Modulus of rupture, Dried=217 PSI

Modulus of rupture (Fired 1 hour at 1800° F.)=119 PSI

Fired linear shrinkage=1.2%

Example 8

A dilute slurry is prepared that contains 80 grams of "Fiberfrax" Regular aluminosilicate fiber in 25 pounds (3 gallons) of water. To this slurry, 4 grams of Westar+ Cationic Corn Flaked Starch (5% by weight of fiber) is added dry and mixed for 5 minutes to allow the starch to hydrate. Next, 24 grams of Megasol™ (50% solids) is added to floc the starch and fibers together in a three dimensional floc, which is then vacuum formed through a 6.5 inch×6.5 inch×1 inch screen mold. The shape is removed form the mold and dried at 250° F. until thoroughly dry (3 to 4 hours). Strength, density, and shrinkage properties of this composite product are given below.

Weight Ratio (fiber:silica:starch)=100:15:5

Silica Starch=3:1
Density Dried=16.8 lbs./ft$^3$
Modulus of rupture, Dried=250 PSI
Modulus of rupture (Fired 1 hour at 1800° F.)=131 PSI
Fired linear shrinkage=1.2%

Example 9

A dilute slurry is prepared that contains 80 grams of "Fiberfrax" Regular aluminosilicate fiber in 25 pounds (3 gallons) of water. To this slurry, 8 grams of Westar+3 Cationic Corn Flaked Starch (10% by weight of fiber) is added dry and mixed for 5 minutes to allow the starch to hydrate. Next, 48 grams of Megasol™ (50% solids) is added to floc the starch and fibers together into three dimensional flocs, which is then vacuum formed through a 6.5 inch×6.5 inch×1 inch screen mold. The shape is removed form the mold and dried at 250° F. until thoroughly dry (3 to 4 hours). Strength, density, and shrinkage properties of this composite product are given below.

Weight ratio (fiber:silica:starch)=100:30:10
silica starch=3:1
density dried=24.3 lbs./ft3
modulus of rupture, dried =502 psi
modulus of rupture (fired 1 hour at 1800° F.)=200 psi
fired linear shrinkage=1.2%

What is claimed is:

1. An aqueous ceramic slurry comprising ceramic fibers, cationic starch, and colloidal silica,
    the slurry having a solids content of about 0.5% to about 3% by weight based on total weight of the slurry,
    about 0.5% to about 2% by weight ceramic fiber based on the total weight of the slurry,
    about 0.01% to about 0.7% by weight silica based on the total weight of the slurry,
    about 0.005% to about 0.2% by weight cationic starch based on the total weight of the slurry, remainder water,
    the silica sol having, based on total weight of the sol, about 50% silica having a particle size range of from about 7 nm to about 200 nm and a specific surface area of about 100 m$^2$/gm to about 10 m$^2$/gm, remainder water.

2. The slurry of claim 1 wherein the sol has a pH of about 8.0 to about 10.0, and a titratable Na$_2$O content of about 0.02 to about 0.35%.

3. The slurry of claim 1 wherein the slurry is a modified slurry that includes a ceramic filler.

4. The slurry of claim 1 wherein the slurry has a ratio of silica to starch of about 1:1 to about 5:1.

5. The slurry of claim 1 wherein the ceramic fibers are selected from the group of alumina, silica, glass, mineral wool, and aluminosilicate fibers.

6. The slurry of claim 4 wherein the cationic starch is a pregelationized cationic corn starch having a cationic charge of about 0.18% N$_2$ to about 0.3% N$_2$, and a pH of about 4 to 8.

7. The slurry of claim 1 wherein the slurry has a solids content of about 0.7% to about 1% by weight based on total weight of the slurry,
    about 0.7% by weight ceramic fiber based on the total weight of the slurry,
    about 0.02% to about 0.21% by weight silica based on the total weight of the slurry,
    about 0.01% to about 0.07% by weight cationic starch based on the total weight of the slurry, and
    the silica sol has a particle size range of from about 10 nm to about 180 nm and a specific surface area of about 60 m$^2$/gm to about 27 m$^2$/gm.

8. The slurry of claim 3 wherein the modified slurry comprises
    about 0.07% to about 1.7% by weight of solids based on total weight of the modified slurry,
    ceramic fibers in an amount of about 0.7% based on the total weight of the modified slurry,
    silica in an amount of about 0.02% to about 0.21% based on the total weight of the modified slurry,
    cationic starch in an amount of about 0.01% to about 0.07% based on the total weight of the modified slurry,
    remainder water.

9. The slurry of claim 8 wherein the cationic starch is a pregelationized cationic corn starch having a cationic charge of about 0.18% N$_2$ to about 0.22% N$_2$.

10. A dried ceramic product comprising ceramic fiber in an amount of about 62% to about 96% by weight based on total weight of dried ceramic product,
    about 2% to about 30% by weight silica based on total weight of the product, and
    about 1% to about 8% by weight of cationic starch based on the total weight of the product,
    the silica having a particle size of about 7 nm to about 200 nm and a specific surface area of about 100 m$^2$/g to about 10 m$^2$/gm.

11. The dried ceramic product of claim 10 having a modulus of rupture of about 100 PSI to about 500 PSI, a density of about 14 lb/ft$^3$ to about 25 lb/ft$^3$, and a Shore hardness of about 60 to about 80.

12. The dried ceramic product of claim 11 having a weight ratio of ceramic fiber:silica:starch of about 100:15:5, and a modulus of rupture of about 250 PSI.

13. A dried ceramic product of claim 9 wherein the product comprises ceramic fiber in an amount of about 72% to about 94% by weight based on total weight of the ceramic product,
    about 4% to about 21% by weight silica based on total weight of the product,
    about 2% to about 7% by weight of cationic starch based on the total weight of the product, and
    silica having a particle size of about 10 nm to about 180 nm and a specific surface area of about 60 m$^2$/g to about 27 m$^2$/gm.

* * * * *